July 5, 1960
H. SAHLIN
2,943,748
LOADING AND UNLOADING APPARATUS
Filed May 9, 1955
3 Sheets-Sheet 1
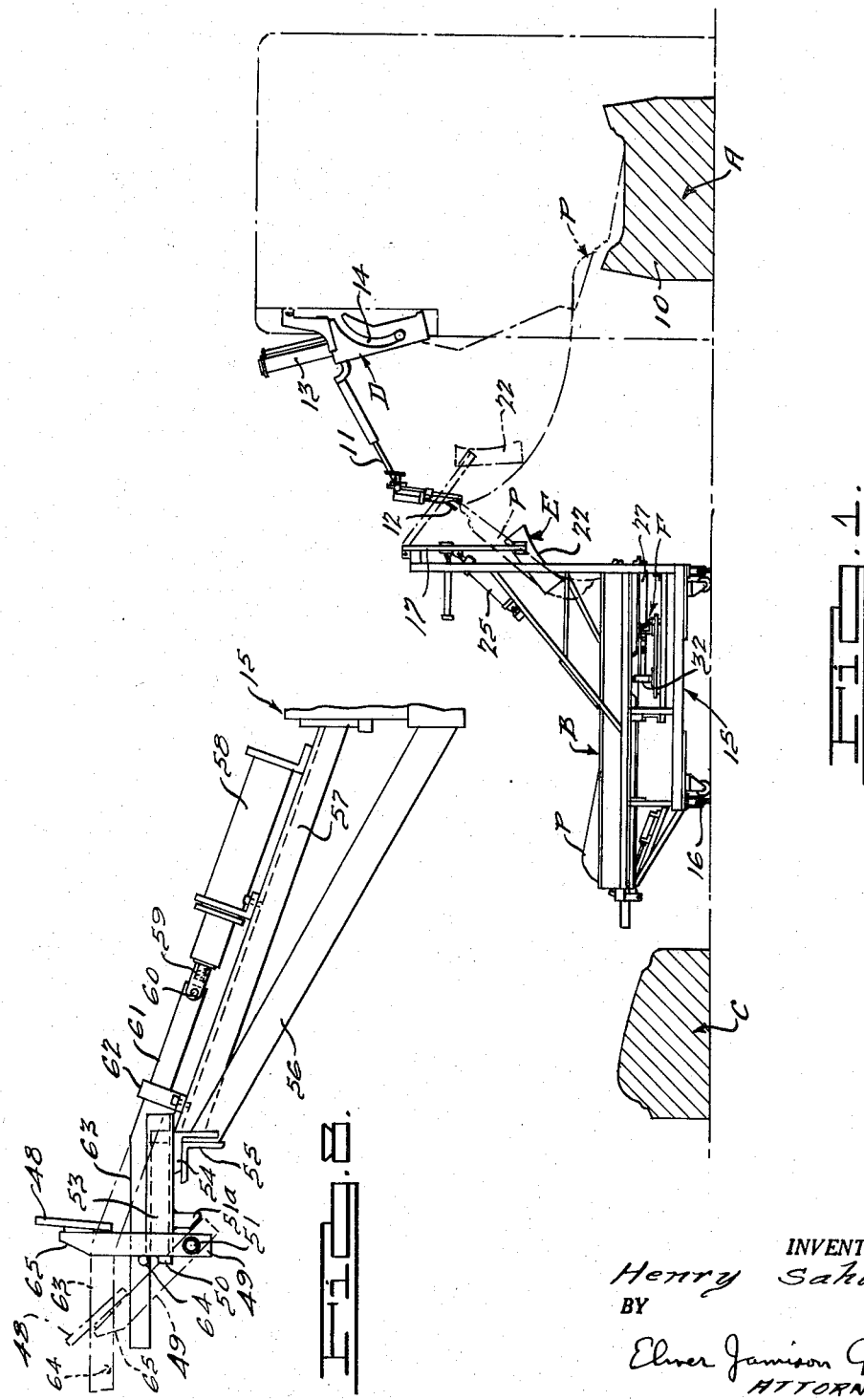
INVENTOR.
Henry Sahlin
BY
Elmer Jamison Gray
ATTORNEY.

July 5, 1960
H. SAHLIN
2,943,748
LOADING AND UNLOADING APPARATUS
Filed May 9, 1955
3 Sheets-Sheet 2
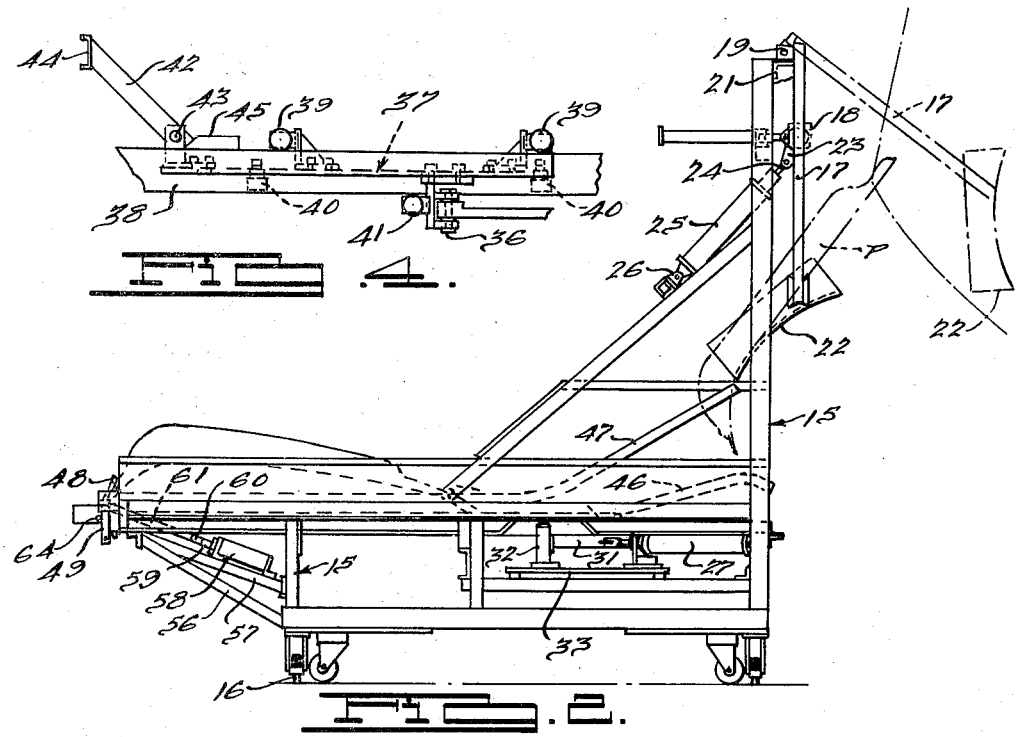
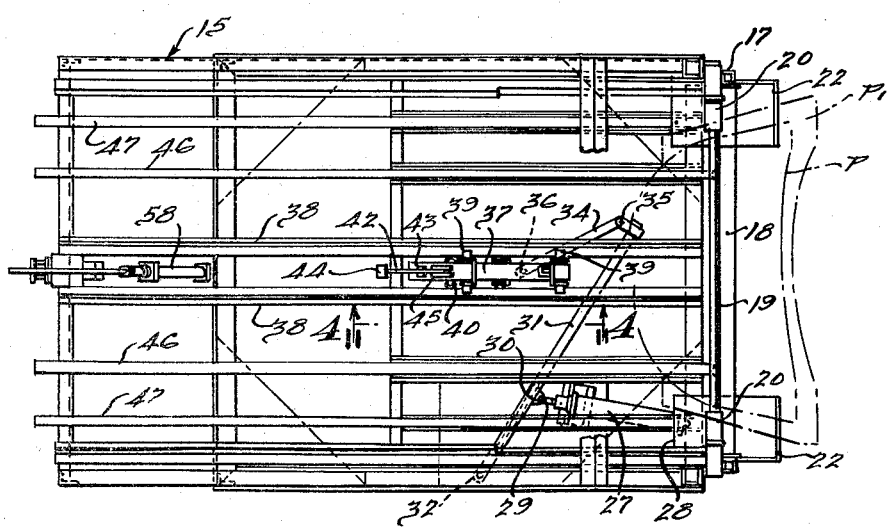
INVENTOR.
Henry Sahlin
BY
Elmer Jamison Gray
ATTORNEY July 5, 1960 H. SAHLIN 2,943,748
LOADING AND UNLOADING APPARATUS
Filed May 9, 1955 3 Sheets-Sheet 3

INVENTOR.
Henry Sahlin
BY
Elmer Jamison Gray
ATTORNEY.

United States Patent Office 2,943,748
Patented July 5, 1960

2,943,748

LOADING AND UNLOADING APPARATUS

Henry Sahlin, deceased, late of Birmingham, Mich.; Richard T. Sahlin and National Bank of Detroit, executors of the estate of said Henry Sahlin, assignors to Sahlin Engineering Company, Inc., Birmingham, Mich., a corporation of Michigan Filed May 9, 1955, Ser. No. 506,755

10 Claims. (Cl. 214—1)

This invention relates to an apparatus and method for mechanically handling materials and in particular to a transfer mechanism and method for successively unloading or withdrawing metal stampings, pressed metal panels or other work sheets from a press or machine, inverting the stampings or panels and thereafter loading or feeding the stampings or panels successively into a second press wherein a further operation is performed on the work. As an example of one use to which the invention may be put, an automobile body panel may at a first station be stamped or pressed from a sheet metal blank by die operation in a draw press. The stamped panel may then be mechanically unloaded or removed from the press and carried to a second station where the panel is disposed successively in partially and then fully inverted position. Thereafter the panel is fed from the second station to a third station, such as onto the trimming die of a press wherein the edges of the panel are trimmed.

In the particular embodiment of the invention herein illustrated by way of example the preferred means for unloading the work from the stamping or draw press at the first station comprises the swinging pendant or unloading arm of a power operated unloader constructed in accordance with my Patent No. 2,609,776, dated September 9, 1952. The lower end of the pendant arm is provided with fluid actuated jaws for gripping an edge of the panel or work in the stamping press. The pendant arm is operated to raise and swing the work away from the draw press toward the second station. At this second station, which may be termed the pre-load station, there is provided a loading frame, stand or rack having means for urging the panel toward inverted position, guiding the panel into fully inverted position at the pre-load station when released by the swinging pendant arm, and thereafter feeding or pushing the panel into the trimming press at the third station.

In accordance with the preferred embodiment there is provided on the loading stand or rack a vertically swinging arm or turn-over device which is preferably operated by fluid actuated means. As the panel is swung outwardly from the draw press and to the pre-load station at or near the limit of outward travel of the unloader, i.e. the swinging pendant arm, the turn-over device is swung downwardly to engage the panel from behind and below and urge the latter to a momentary controlled position of rest wherein the panel assumes a tilted or partially inverted position. The gripping jaws of the unloader are then automatically operated to release the upper edge of the panel whereupon the panel will slide by gravity onto the loading frame into fully inverted or upside down position at the pre-load station.

Also in the present embodiment of the invention there is provided on the loading frame or stand an improved fluid actuated means automatically operated in timed relation to the operation of the trim and draw presses for feeding the inverted panel from the pre-load station into the trim press. The coordinated sequence of operations is controlled through suitable electrical means in turn controlled by a suitable number of primary limit switches.

Other objects of this invention will appear in the following description and appended claims, reference being had to the accompanying drawings forming a part of this specification wherein like reference characters designate corresponding parts in the several views.

Fig. 1 is largely a diagrammatic view illustrating the method of withdrawing or unloading a panel or work sheet from a press at one station, transferring a work sheet to a loading stand at a second station whence the work sheet is transferred or fed to a second press or machine at a third station.

Fig. 2 is a side elevation of the loading stand or rack illustrating the swinging turn-over arm in its downward position and the pusher mechanism in retracted position.

Fig. 4 is a fragmentary enlarged sectional view taken in the direction of the arrows along the line 4—4 of Fig. 3.

Fig. 5 is a view similar to Fig. 3, showing the pusher mechanism at its forward position.

Fig. 8 is a fragmentary side elevation showing the stop mechanism of Fig. 7 mounted on the front end of the loading stand, the view of the stop mechanism being taken in the direction of the arrows along the line 8—8 of Fig. 7.

Figure 3:
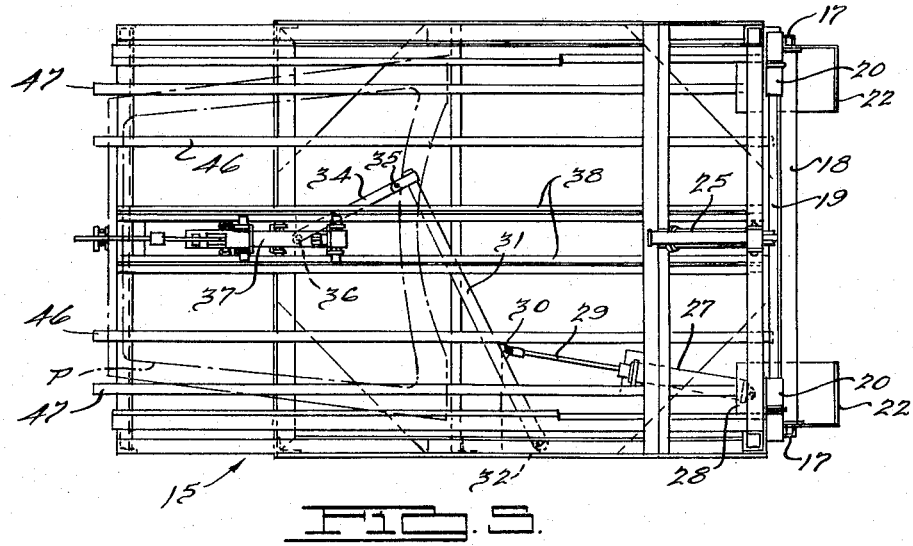
Fig. 3 is a plan view of the loading stand illustrated in Fig. 2, the upper portion comprising the swinging turn-over device or arm being broken away.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated, by way of example, an apparatus by means of which the present method may be carried out. Although the illustrated apparatus is employed for the purpose of forming and handling a sheet metal panel, such as the hood or bonnet of an automobile body, it will be understood that the present method is applicable to the handling of various types of panels, stampings and work sheets.

Referring to Fig. 1, there is illustrated at A a machine in the form of a draw press for performing a stamping or draw operation at a first station on a metal sheet to form a panel P. At B there is illustrated a loading frame or rack to which the work sheet P is transferred and turned over or inverted at a second station. At C there is illustrated a second machine, such as a trim press, representing a third station to which the work sheet is transferred from the loading stand at the second station. At D there is illustrated a draw press unloader which is preferably constructed in accordance with the unloading mechanism illustrated in my Patent No. 2,609,776 and which is operated to withdraw the work sheet from the machine at station A and swing it into position at station B. Mounted on the unloading stand B is a swinging arm or turn-over device E which partially inverts or turns over the work sheet and momentarily supports it in that position. The loading stand B also carries a pusher or feed mechanism F which is operated to propel the work sheet from station B to station C.

The machine or draw press A comprises a conventional lower die 10 with which the usual vertically reciprocating ram of the press cooperates to form the panel or work sheet P.

In the present instance the panel P is formed in inverted position in the press A, the upper side comprising a rough interior surface and the lower side comprising an exterior surface adapted to be finished and polished. The panel P is also formed with salvage edges P1 which are subsequently removed at the trim press C.

The unloader mechanism D, as more fully shown in my above identified patent, is provided with a swinging pendant or unloading arm 11 carrying gripping jaws 12 adapted to close and grip the salvage edge of the work sheet after completion of an operation at station A. In the unloading operation the pendant arm 11 is shifted vertically, as by fluid pressure means 13, and swung away from the press A through cam means indicated in part at 14. The range of swinging motion of the pendant arm is illustrated in broken lines in Fig. 1.

The loading stand B, which is anchored at the proper location at the second station, comprises a suitable supporting framework 15 composed of various frame members rigidly attached together. The supporting frame of the loading stand is illustrated as portable and is preferably provided with adjustable legs 16 to station the frame against displacement at the proper location with respect to the first and third stations.

Figures 6, 7:
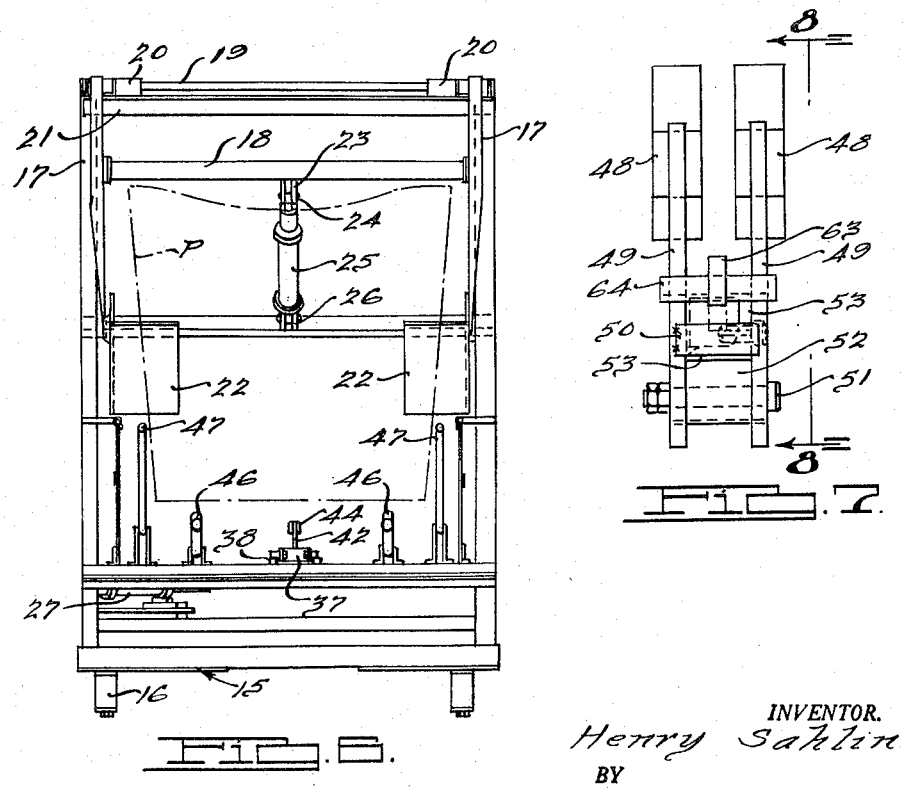
Fig. 6 is an end elevation of the loading stand taken from the right in Fig. 2.
Fig. 7 is a front view of the panel stop mechanism removed from the loading stand.

The up and down swinging arm device, which may also be termed a panel inverting or turn-over device, comprises a pair of transversely spaced swinging arms 17 connected together intermediate their ends by a horizontal transverse bar 18, Fig. 6. The bars 17 adjacent their upper ends are attached to a transverse rock shaft 19, which is pivotally supported near opposite ends by mounting blocks 20 supported in turn on a transverse member 21 of frame 15. The latter is secured at its opposite ends to a pair of transversely spaced rear pillars of the frame 15. Secured to the lower ends of the two arms 17 are a pair of panel guides 22. Thus by turning the rock shaft in one direction or the other the turn-over device E including the guides 22 will swing vertically as well as forwardly and rearwardly with respect to the stand B. Attached to the cross bar 18 connecting the arms 17 is a crank or lever arm 23. The lower end of this lever arm is pivotally connected to a piston rod 24 carrying a reciprocable piston within an air cylinder 25 which is pivotally connected at its lower end to a bracket 26 on the frame 15.

Fluid actuated means is also provided for operating the pusher or feed mechanism F carried by the loading stand or rack B. This operating means comprises an air cylinder 27 pivotally connected at one end to a bracket 28 on the frame. The cylinder carries a reciprocating piston to which is attached a piston rod 29 pivotally connected at 30 to a horizontally swinging lever 31. The outer end of lever 31 is attached to a vertical rock shaft 32 pivotally supported by a bracket 33 of the frame 15. A connecting or pusher arm 34 is pivotally connected at 35 to the inner end of arm 31 and at 36 to the underside of a carriage 37.

Referring particularly to Figs. 3 and 4, the carriage 37 is provided for travel along a pair of transversely spaced rails or track means 38 secured at opposite ends to the frame 15 of stand B. The carriage rides on two longitudinally spaced pairs of rollers 39 journaled thereon and adapted to travel along the upper edges of the rails 38. Similarly, the carriage 37 carries two longitudinally spaced pairs of rollers 40, adapted to roll along the confronting inner vertical sides of the rails 38, and a pair of lower rollers 41 adapted to roll along the bottom edges of the rails 38.

A pusher pawl device 42 in the form of a vertically swinging longitudinally extending bar is pivotally mounted on a stud 43 carried by the carriage 37. The pusher pawl 42 terminates at its forward end in a nose 44 adapted to engage the rear edge of the work sheet P for feeding the same from the loading stand into the machine or press C. Rearwardly of the pivot 43, the pawl 42 extends horizontally and carries a counterbalance 45 which normally rests on the carriage 37 and holds the pawl 42 in the forwardly inclined position shown in Fig. 4. Thus the pawl 42 is free to swing downwardly as described below upon upward tilting of the counterbalance 45 from the carriage.

In the illustrated loading frame structure B there are provided, see Fig. 6, a pair of inner longitudinally extending forwardly declined guide bars or rails 46 for supporting and guiding the front edge of the panel P as it slides from an upright position on the guides 22 to a fully inverted position. These inner guide bars 46 are provided in the present instance since the forward edge of the panel is narrower than the rear edge. Where the panel is of substantially uniform width, such as in the case of the roof panel of an automobile body, the inner guide bars 46 may be eliminated. In addition to these inner guide bars there are provided two outer longitudinally extending forwardly declined guide bars or rails 47, Fig. 6, which support and guide the rear wider edge of the panel P. As described below, the guide bars 46 and 47 comprise a slideway sufficient to support and guide the front and rear salvage edges of the panel as it slides into inverted position on the loading stand.

In order to limit forward sliding movement of the panel P after the latter is released from the jaws 12 onto the slide or guide bars 46 and 47 as described below, a stop mechanism illustrated in Figs. 7 and 8 is provided at the forward end of the loading frame B. The stop mechanism comprises a pair of transversely spaced bumpers 48 secured to the upper ends of a pair of vertically swinging levers 49 joined by a tie bracket 50 to swing in unison about a transverse pivot 51 supported in a block 52. The latter is welded to the underside of a longitudinally extending bracket 53, which in turn is welded at its rear end to the upper portion of a transverse angle bracket 54 suitably secured to an underlying transverse bracket 55 supported at the forward end of an inclined strut 56 of the frame 15.

Also connecting the bracket 54 and frame 15 is an inclined platform 57 on which is supported an inclined longitudinally extending air cylinder 58. The latter contains a reciprocal piston having a forwardly extending plunger 59 pivotally connected at 60 to a reciprocating dog-leg shaft 61 which extends slidably through a retaining yoke 62 mounted on the platform 57. The shaft 61 terminates forwardly in a horizontal portion 63 secured to a transverse stop pin 64 located immediately in front of the swinging levers 49 when plunger 59 is at its retracted condition within the cylinder 58. In this condition, rearward swinging of the bumpers 48 is limited by bracket 50 abutting the forward end of the bracket 53, and forward swinging of the bumpers 48 is yieldingly resisted by the air pressure urging plunger 59 to its retracted condition. The limit of forward swinging of bumpers 48 is determined by abutment between the lower ends of the levers 49 and a stop 51a depending from bracket 53, Fig. 8.

The bumpers 48 normally extend upright in the path of forward sliding movement of the panel P to block such movement. Upon forward movement of the plunger 59, the stop pin 64 is moved forwardly to the position indicated in phantom, Fig. 8, permitting forward and downward swinging of the bumpers 48 to the dotted position shown and out of the path of forward movement of the panel P. The upper forward edges of the levers 49 are chamfered at 65 to provide a cam edge engageable by pin 64 upon contraction of plunger 59, whereby the levers 49 are swung upwardly and returned to their position shown in solid lines Fig. 8.

The sequence of operation of the structure described is controlled by suitable electrical circuits and limit switches. In timed relation to the unloading of the trim panel C after completion of a trimming operation, air cylinder 58 of the stop mechanism is actuated to move plunger 59 forwardly and thereby to move stop 64 to the phantom position shown in Fig. 8 and release the bumper arms on levers 49 for forward and downward swinging movement. Simultaneously or shortly thereafter, air cylinder 27 of the feed or pusher mechanism F is actuated to shift plunger 29 forwardly, thereby to swing lever 31 and move carriage 37 along the tracks 38 to the dotted position shown in Fig. 5. In consequence an inverted panel P on the loading stand B in advance of the pusher 44 is moved by the latter onto the trim press C.

Thereafter the cylinders 27 and 58 are actuated to retract their respective plungers 29 and 59, thereby to cause retraction of carriage 37 to the position shown in Fig. 3 and to cause retraction of stop pin 64 to the position shown in Fig. 8. Upon rearward movement of stop 64, the latter engages cam edge 65 and swings the bumper arms 49 upwardly to the blocking position shown in Fig. 8. The gripping jaws 12 are then actuated to release the next successive panel held in readiness in the partially inverted position shown in Fig. 1, allowing the latter panel to slide forwardly along the guide bars or rails 46 and 47 to the fully inverted position on the stand B.

As the panel slides forwardly and strikes the rear edge of the inclined pawl 42, the latter will swing freely forwardly and downwardly. After passage of the panel, the counterbalance 45 will return the pawl 42 to the position shown in Fig. 4. The forward sliding movement is limited by the bumpers 48, the impact of the panel being cushioned by the pneumatic cylinder 58 which serves as shock absorbing means.

After release of the partially inverted panel at the pre-load station B, and at a predetermined point in the operation of the forming press A, cylinder 25 is actuated to extend plunger 24 and swing the turn-over arms 17 upwardly to the phantom position shown in Fig. 2. Similarly the unloader D is actuated to swing arm 11 rearwardly to the draw press A, grip the adjacent salvage edge of a newly formed panel in the jaws 12, then raise and swing the panel forwardly to the pre-load station B.

Cylinder 25 is then actuated to retract plunger 24 and swing the turn-over arms 17 downwardly and forwardly to engage the forward portions of the guides 22 with the rear lower surface of the panel suspended at the pre-load station. It is to be noted in this regard that the rough surface of the panel P which was formerly the upper surface in the forming press A is now the rear surface of the panel at the pre-load station B. The guides 22 in the present instance are preferably arranged on the lower ends of the arms 17 so as to engage the lower rough rear surfaces of the salvage flanges P1 and tilt the panel to the forwardly declined partially inverted position shown in Fig. 1. In the latter position, the guides 22 cooperate with the guide bars 46 and 47 to complete a declined slideway adapted to guide the panel into fully inverted position upon its release from the jaws 12. Also in the above regard, the guide rails or bars 46 and 47 are preferably arranged to engage the underside of the partially inverted panel at the region of the salvage flanges P1 on which the panel slides to the inverted position. Accordingly any damage to the panel in the inversion process is sustained by the salvage flanges which are subsequently trimmed from the panel at station C. In the event that portions of the panel are scratched while moving along the guides or slideways 22, 46, 47, such scratches will be on the rough underside of the panel and will be unobjectionable.

Important advantages achieved by virtue of the present invention reside in the fact that the panel F is under positive control of the unloader D and guide means 22, 46, 47 throughout the inverting and pre-loading operations. Thus is eliminated the possibility of marring or damaging the outer surfaces of the work sheet or panel which becomes the exposed surfaces of the automobile that are coated with paint or lacquer. Also a compact efficient apparatus for inverting the panel P and for shifting the same from the pre-load station B to the trim station C is achieved by virtue of the arrangement of the swinging turn-over device pivotally mounted on the upper rear portion of the stand B above the partially inverted panel suspended from the jaws 12 at the pre-load station, and the arrangement of the feed or pusher mechanism F, including carriage 37, tracks 38, cylinder 27, plunger 29, and horizontally swinging lever 31, all mounted on stand B below the lower forward portions of the guide bars or rails 46 and 47.

I claim:

1. A material handling apparatus comprising a loading stand, a swinging unloader arm from which a work sheet is suspended after transfer thereof from an adjacent press, a turn-over device having lower swinging panel guide means and an upper portion pivotally mounted on said stand to swing said guide means upwardly and downwardly about an axis located above said sheet when the latter is suspended from said unloader arm, control means for initially swinging said device upwardly to a position enabling the suspended sheet to pass beneath and forwardly of said panel guide means, said control means being thereafter effective to swing said device downwardly to engage said guide means with the lower edge of the suspended work sheet and to urge said sheet into partially inverted position, and guide rail means declining from adjacent said guide means and cooperating therewith to guide said sheet into inverted position on said stand upon release of said sheet by said unloader arm.

2. A material handling apparatus according to claim 1 having bumper means pivotally mounted on said stand in the path of movement of the inverted work sheet on said stand, and pneumatic shock absorbing means yieldingly resisting swinging of said bumper means from said path.

3. A material handling apparatus according to claim 2 wherein said shock absorbing means comprises an air cylinder having a forwardly and rearwardly shiftable plunger, said plunger having a stop portion engaged with said bumper means in advance thereof and being shiftable forwardly to release said bumper means for swinging forwardly out of said path.

4. A material handling apparatus according to claim 3 wherein the forward edge of said bumper means comprises a cam adapted to ride along said stop portion upon rearward shifting of said plunger after said bumper means has swung forwardly out of said path, thereby to effect return of said bumper means into said path.

5. In a material handling apparatus having a swinging unloader arm adapted to grip an edge of a work sheet and to suspend said sheet by said edge, a loading stand disposed below said sheet when suspended from said arm, a turn-over device pivotally mounted on the stand and having sheet engaging means, control means for initially swinging said device in an upward direction to a position enabling the suspended sheet to pass beneath and forwardly of said sheet engaging means, said control means being thereafter effective to swing said device in a downward direction toward one side of the suspended work sheet to cause said engaging means to engage the sheet and urge it in said direction to partially inverted position, and guide means engageable with said one side of the sheet upon release thereof by said unloader arm and effective to guide sliding movement of said sheet into inverted position on said stand.

6. In a material handling apparatus having a swinging unloader arm adapted to grip an edge of a work sheet and to suspend said sheet by said edge, a loading stand disposed below said sheet when suspended from said arm, a turn-over device having sheet engaging means, means for pivotally mounting said device on the stand at a locality above said sheet engaging means when in operative position, control means for initially swinging said device in an upward direction to a position enabling the suspended sheet to pass beneath and forwardly of said sheet engaging means, said control means being thereafter effective to swing said device in a downward direction toward one side of the suspended work sheet to cause said engaging means to engage the sheet and urge it in said direction to partially inverted position, and guide means on said stand engageable with said one side of the sheet upon release thereof by said unloader arm and effective to guide sliding movement of said sheet into inverted position on said stand.

7. A material handling apparatus comprising a loading stand, a swinging unloader arm adapted to grip an edge of a work sheet and to suspend said sheet by said edge above said stand, a turn-over device pivotally mounted on the stand and having guide means, control means for initially swinging said device in an upward direction to a position enabling the suspended sheet to pass beneath and forwardly of said guide means, said control means being thereafter effective to swing said device in a downward direction toward one side of the suspended work sheet to engage said guide means with said sheet and to urge said sheet in said direction to partially inverted position, and means on said stand engageable with said one side of the sheet upon release thereof by said unloader arm and effective to guide sliding movement of said sheet in inverted position on said stand.

8. A material handling apparatus comprising a loading stand, a swinging unloader arm from which a work sheet is suspended after transfer thereof from an adjacent press, a turn-over device pivotally mounted on the stand to swing upwardly and downwardly and having panel guide means adjacent its swinging end, control means for initially swinging said device in an upward direction to a position enabling the suspended sheet to pass beneath and forwardly of said guide means, said control means being thereafter effective to swing said device downwardly to engage said guide means with the lower portion of the work sheet suspended from said unloader arm and to urge said sheet into partially inverted position, and inclined guide rails on said stand for guiding the partially inverted work sheet from said guide means into inverted position on the stand upon release thereof by said unloader arm.

9. A material handling apparatus comprising a loading stand, a swinging unloader arm from which a work sheet is suspended after transfer thereof from an adjacent press, a turn-over device having lower swinging panel guide means and an upper portion pivotally mounted on said stand to provide for upward and downward swinging motion of the guide means about an axis located above said sheet when the latter is suspended from said unloader arm, control means for initially swinging said device in an upward direction to a position enabling the suspended sheet to pass beneath and forwardly of said guide means, said control means being thereafter effective to swing said device downwardly to engage said guide means with the suspended work sheet and to urge said sheet into partially inverted position, and means on said stand for guiding said work sheet from said guide means into inverted position on the stand upon release thereof by said unloading arm.

10. A material handling apparatus comprising a loading stand, a swinging unloader arm adapted to grip an edge of a work sheet and to suspend said sheet by said edge above said stand, a turn-over device pivotally mounted on the stand to swing upwardly and downwardly, said device having arm means, control means for initially swinging said device in an upward direction to a position enabling the suspended sheet to pass beneath and forwardly of said arm means, said control means being thereafter effective to swing said device in a downward direction to engage said arm means with the work sheet suspended from said unloader arm and to urge said sheet into partially inverted position, and means on said stand for guiding said work sheet from said turn-over device into inverted position on the stand upon release thereof by said unloader arm.

References Cited in the file of this patent

UNITED STATES PATENTS

| | | |
|---|---|---|
| 1,476,050 | Buttress | Dec. 4, 1923 |
| 1,735,443 | Randles et al. | Nov. 12, 1929 |
| 2,263,199 | Wachter et al. | Nov. 18, 1941 |
| 2,264,826 | Butterfield | Dec. 2, 1941 |
| 2,609,776 | Sahlin | Sept. 9, 1952 |
| 2,644,594 | Komuchar et al. | July 7, 1953 |
| 2,814,395 | Sahlin | Nov. 26, 1957 |